(12) United States Patent
McKenna et al.

(10) Patent No.: US 11,287,272 B2
(45) Date of Patent: Mar. 29, 2022

(54) COMBINED ROUTE PLANNING AND OPPORTUNISTIC SEARCHING IN VARIABLE COST ENVIRONMENTS

(71) Applicant: INTERNATIONAL BUSINESS MACHINES CORPORATION, Armonk, NY (US)

(72) Inventors: Sean McKenna, Blanchardstown (IE); Adi Botea, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 437 days.

(21) Appl. No.: 16/194,773

(22) Filed: Nov. 19, 2018

(65) Prior Publication Data
US 2020/0158526 A1    May 21, 2020

(51) Int. Cl.
*G01C 21/34* (2006.01)
*G06Q 50/30* (2012.01)
*G06F 16/27* (2019.01)

(52) U.S. Cl.
CPC ........ *G01C 21/3453* (2013.01); *G06F 16/27* (2019.01); *G06Q 50/30* (2013.01)

(58) Field of Classification Search
CPC ...... G01C 21/3453; G06F 16/27; G06Q 50/30
See application file for complete search history.

(56) References Cited

U.S. PATENT DOCUMENTS

| 8,214,142 | B2 * | 7/2012 | Cerecke | G01C 21/3446 |
| | | | | 701/408 |
| 9,518,829 | B2 * | 12/2016 | Parker | G01C 21/3667 |
| 2005/0216182 | A1 | 9/2005 | Hussain et al. | |
| 2015/0276419 | A1 * | 10/2015 | Hashem | G01C 21/20 |
| | | | | 701/425 |
| 2015/0345967 | A1 * | 12/2015 | Meuleau | G01C 21/3453 |
| | | | | 701/25 |
| 2016/0257323 | A1 * | 9/2016 | Meyer | B61L 27/0027 |
| 2017/0277195 | A1 | 9/2017 | Frazzoli et al. | |
| 2018/0268720 | A1 * | 9/2018 | Sharma | G08G 5/0034 |
| 2019/0188608 | A1 * | 6/2019 | Gururajan | G06Q 10/02 |
| 2019/0364492 | A1 * | 11/2019 | Azizi | H04W 52/0264 |

FOREIGN PATENT DOCUMENTS

CN    105067004 B    10/2017

OTHER PUBLICATIONS

Smith, Stephen Leslie, Task Allocation and Vehicle Routing in Dynamic Environments, University of California Santa Barbara, Sep. 2009.*

Dolgov et al., "Detection of Principal Directions in Unknown Environments for Autonomous Navigation," http://ai.stanford.edu, Jun. 2008 (8 pages).

* cited by examiner

*Primary Examiner* — Nathan Erb
(74) *Attorney, Agent, or Firm* — Griffiths & Seaton PLLC (57) ABSTRACT

A system and method for combined route planning and opportunistic searching in variable costs environments are presented. A route for a vehicle may be dynamically planned according to an opportunistic search of an unknown domain to achieve one or more secondary objectives while both progressing towards a primary objective and minimizing travel costs using one or more Internet of Things (IoT) sensors and computing devices and a knowledge of a location of the vehicle relative to one or more waypoints.

23 Claims, 7 Drawing Sheets

COMBINED ROUTE PLANNING AND OPPORTUNISTIC SEARCHING IN VARIABLE COST ENVIRONMENTS

BACKGROUND OF THE INVENTION

Field of the Invention

The present invention relates in general to computing systems, and more particularly to, various embodiments for combined travel route planning and opportunistic searching in variable costs environments by a processor connected to an autonomous or driven vehicle with capability for local sensing.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices for personal, business, health, home, education, scientific, legal, or governmental related areas of interest. As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments for combined route planning and opportunistic searching in variable cost environments in a computing environment are provided. In one embodiment, by way of example only, a method for route planning and opportunistic searching in an edge computing environment, again by a processor, is provided. A route for a vehicle may be dynamically planned according to an opportunistic search of an unknown domain to achieve one or more secondary objectives while both progressing towards a primary objective and minimizing travel costs using one or more Internet of Things (IoT) sensors and computing devices and a knowledge of a location of the vehicle relative to one or more waypoints.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The prolific increase in the use of computing appliances in computing systems, particularly within a computing environment, in a variety of settings provide various beneficial uses to a user. For example, various computing systems (e.g., Internet of Things "IoT" appliances) may be used for personal use, such as travel or exercise, while also using the computing appliances within various types of navigation systems for travel. Such information may be provided to a user during navigation along a route via an in-car navigation device, such as a personal navigation device (PND) or integrated device, or may be provided as an input to an Advanced Driver Assistance System (ADAS).

Moreover, vehicles of every kind, size, and energy consumption are prevalent in every aspect of today's society, as people are more mobile today than likely at any time in recorded history. Autonomous vehicles are quickly growing in popularity and will become the majority of vehicles on the road at some point in the future. Autonomous vehicles or self-driving vehicles ("SDVs") are vehicles that are able to autonomously drive themselves through private and/or public spaces. Additionally, the use of drones, such as unmanned aerial vehicles ("UAVs")/unmanned aerial systems ("UASs"), has becoming increasingly popular in the hobbyist/consumer and public/private sector markets. (As used herein, UAV and UAS may be used interchangeably in reference to a drone).

Given the rapid growth in the use and demand in various travel industries, there is an increased need to adapt to these demands and industries, particularly for various types of vehicles such as, for example, drones, or SDVs.

For example, a current challenge for vehicles is identifying a best or "optimized" route to travel between two points. The definition of "best" often considers elements of the least amount of effort, a fastest travel time, and/or a minimal distance between the points. The travel may be done on a set of known paths (e.g., a network) or travel may be performed by creating a new path(s) to connect various waypoints. Thus, a first category of travel planning may include determining the best path when the topology of the network and the costs of traversing every segment of the network are known. However, a second category of travel planning may include identifying a route when the path is not restricted to a network and the costs of traversing the domain/network between the start and end points are unknown. That is, the second category of route planning involves discovering the cost landscape along the journey when the network is unknown.

Furthermore, recent developments in autonomous vehicles for traversing land, air and sea create an opportunity for these vehicles to operate as platforms on which additional services can be provided. For example, autonomous vehicles (e.g., ships, cars, trucks, drones, robots, etc., that have multiple degrees of mobility freedom (e.g., two-dimensional "2D" or three-dimensional "3D")) are able to navigate unrestricted (open) spaces for transport of people and goods as well as other missions. This increase of use creates bandwidth for additional services to be offered on these autonomous platforms such as, for example, security, imaging, mapping, prospecting, etc., that may be accomplished simultaneously while the platforms are completing their primary mission. In these situations, a balance is required during route finding between successful completion of a primary mission/objective (e.g., package delivery by a drone) and exploration of unknown spaces for the secondary mission/objective (e.g., image capture for mapping). The Mars rover provides another example where, for example, navigation between two waypoints by the vehicle in an unknown environment with accomplishment of scientific targets along the path.

Accordingly, various aspects of the present invention provide an approach to balancing discovery of a low-cost path (e.g., a low-cost or high-benefit region path) between two or more waypoints in an unknown environment with exploration through an opportunistic local search that is used to extensively explore regions of interest along the way such as, for example, in an area of enabling ancillary services offered on an autonomous vehicle already committed to providing a primary service. Opportunistic search is defined herein as a search to achieve a goal that is of secondary importance relative to simultaneous completion of a primary goal. Requirements and/or constraints imposed by achievement of the primary goal/mission must be adhered to and not disrupted by making progress on the secondary goal/mission. Progress on the secondary goal/mission is opportunistic in that search/discovery/information gain is only done as opportunities present themselves along the path of the primary goal/mission.

In one aspect, the present invention may provide an arbitrary definition of "cost" and provides a tradeoff between a direct path from start to end or a longer path that allows for more searching along the route (e.g., a tradeoff between two objectives by performing a deterministic decision at every step/waypoint of the route). The travel cost/benefit is unknown prior to a start of a journey and is learned via the opportunistic search.

In one aspect, the present invention provides for opportunistic searching with route finding in unknown environments, again by a processor. A route for a vehicle may be dynamically planned according to an opportunistic search of an unknown domain to achieve one or more secondary objectives while both progressing towards a primary objective and minimizing travel costs using one or more Internet of Things (IoT) computing devices and a knowledge of a location of the vehicle relative to one or more waypoints. The vehicles may include a system of sensors (e.g., IoT sensors) that detect and measure chemical or physical attributes of the environment at the location and/or within the surroundings of the vehicle (e.g., drone or SDV). Also, the vehicle contains everything it needs for the opportunistic search including, but not limited, to power, sensors and computing to pursue the missions it has been assigned prior to reaching its destination.

In an additional aspect, the present invention provides for traveling an unknown route between two points by 1) reaching an end point with an integrated minimal cost; and 2) exhaustively exploring regions of interest between a starting and end points that are reasonably proximal to a minimum cost path. A route plan may be determined/computed that is updated in real time at each waypoint along the path. The present invention provides user-defined settings for a tradeoff between taking a direct path to the end point and additional exploration of low-cost areas (e.g., low-cost or high-benefit region) between the start and end points. The present invention provides a set of instructions for the user to update the path for a next segment (e.g., as could be used in a travel advisor/navigation aide deployed in an IoT device such as, for example, a smart watch, a smart phone, and/or in an automotive vehicle. The present invention incorporates one or more way-points into the route planning with only the starting and ending locations and the intermediate way-point locations are known prior to starting the journey. The present invention utilizes real-time knowledge acquisition along the route to determine a route cost (e.g., there is no a priori knowledge of the cost landscape between those points). A cost map may be created based on one or more arbitrary measures and/or a combination of measures of impedance including physical distance, travel time (commuting), the distance to points of interest, or other user-centric measures to define an un-structured environment.

Thus, the present invention provides an opportunistic search of low cost/high benefit locations between the start and end of the journey. A minimum cost (and maximum benefit) path may be learned/determined between two defined locations and an arbitrary number of intermediate waypoints. A resulting map of the observed values of the variable(s) that were the object of the opportunistic search may be generated. A route finding operation may be performed in real time with the updated route provided to one or more users.

The present invention may provide a local search of a selected area (e.g., a defined cell) using one or more IoT sensing devices appropriate to the object of the search to identify cost/benefit conditions in a vicinity of the current location along the journey. A greedy decision may be performed to update the travel path in a local space where both local costs and overall destination goals are included in the cost of local movement. Knowledge of a current location relative to the destination location may be learned/determined via global positioning satellite ("GPS") or other positioning operation. A continuous two-dimensional ("2D") or three-dimensional ("3D") space may be discretized into cells (e.g., selected/defined areas) where a cost/benefit value may be measured and ascribed to each cell in real time.

In this way, mechanisms of the illustrated embodiments identify a path between two specified locations that incorporates a level of opportunistic search as defined by the user. A local search of low cost/high benefit regions may be maximized while simultaneously making progress towards the ultimate journey destination (e.g., primary mission/objective). The present invention does not require a-priori knowledge of the cost/benefit landscape and thus is able to adapt to changes in the landscape over time. The degree of opportunistic search relative to the completion of the primary goal/mission can be controlled by the user/operator.

Additional features and advantages of the combined travel route planning and opportunistic searching system includes using one or more IoT devices associated with each vehicle and/or by combining streams of data from various data sources such as, for example, from publicly and commercially available data sources (e.g., weather data, pollution alert data, governmental data sources, social media feeds, crime data/statistics, traffic data sources, traffic/parking regulations, building design data, and the like), information about the user from one or more IoT devices or sensors (e.g., schedule, biometric data, hand/face gesture data) such as, for example, wearable devices or sensors, and/or from data available on-board a vehicle (e.g., proximity sensors, cameras, radio frequency identification "RFID" readers, biometric sensors, wearable sensors, driving history, charge/fuel state of car, etc.). The stream of data may be processed and the real-time flux of information enables the generation of knowledge or knowledge domain/ontology (e.g., route choice, user fatigue) and enables the combined travel route planning and opportunistic searching, using cloud computing and/or edge computing technology.

Also, as used herein, a vehicle may be a drone (e.g., UAV/UAS), an automobile, a SDV, bicycle, hovercraft, scooter, bus, motorcycle, boat, ship, aircraft, plane, helicopter, drone, off road vehicle, truck, tractor, and/or other device used for movement or transportation. Also, sensors may include proximity sensors, cameras, radio frequency identification "RFID" readers, biometric sensors, wearable sensors, computers, handheld devices (e.g., Global Positioning System "GPS" device or step counters), smart phones, and/or other sensor based devices.

In an additional embodiment, the present invention enables an autonomous or manually controlled vehicle to accomplish an opportunistic search towards achievement of a secondary mission while ensuring the constraints of the primary mission are met. The balance between minimizing a cost of the journey and maximizing a level of the opportunistic search may be maintained by utilizing information from both a local search with on-board sensors and knowledge of a location of the vehicle relative to the next waypoint.

The local costs to traverse a space may be unknown a priori and are only determined within each local neighborhood during the journey. The present invention utilizes coordinates of the starting and ending locations of a journey and/or utilizes coordinates of any intermediate waypoints that must be visited on the journey. The present invention may use off-vehicle signals (e.g., GPS) to determine a current vehicle location relative to a next waypoint/destination. The present invention utilizes information derived from sensors mounted on the vehicle. The local cost environment may be mapped from the on-board sensor data. Local travel costs may be determined in real-time during the journey as defined on a mesh/grid. The present invention may balance the degree of opportunistic search performed along the route against a shorter path to the next waypoint. A localized learning system may be engaged to define/discover the travel costs in the local neighborhood/geographical region. That is, a vehicle may be using on-board sensing to map the cost landscape in the local neighborhood before deciding where to move. The transformation of the sensor input (e.g., voltage or pixelated image) into a cost value for each cell requires some analytics and may be performed using machine learning operations and/or artificial intelligence "AI." This is "localized" in that the model has been previously trained on historical data and is now operating in real-time and locally on the vehicle without inputs beyond those of the on-board sensors. Also, "locally" in the sense these analytics are using the sensor data to learn the costs of a current neighborhood/area around the vehicle and will continue to do so as the vehicle moves from one locality to the next.

Results of a local search may be used to maximize opportunistic search in low cost (high benefit) locations while minimizing searching of high cost (low benefit) locations. A weighting strategy (e.g., rank a primary mission/objective and each secondary mission/objective) may be used to combine local costs and final destination goals into a strategy for the next, local, move or transition. The present invention may identify (e.g., discover) a route to each designated waypoint that is longer in distance and/or time as compared to a straight-line distance, but of significantly lower cost (higher benefit) than a random search of the area. The present invention minimizes and tracks the number of times a location (e.g., cell) is revisited along a route as can occur when the search leads to a cell for which all neighbors have already been visited (e.g., a dead-end).

The so-called route or "journey" may be very subjective and context dependent. A journey may simply be, in a broadest possible meaning, the entire/whole travel experience from a point A to a point B. For example, a journey may encompass an entire travel experience. The journey may start with initiating transport with a first mode of transport and the journey may end with reaching a final destination by a final mode of transport. In a more limiting context, a journey may include one or more actions or movements of traveling from one location to another location. The journey may also include one or more acts, events, decisions, or travel related operations relating to one or more acts of moving from one location to one or more alternative locations. A journey may include each decision, experience, action, and/or movement within and without a vehicle. A journey may include one or more routes and destinations. A journey may also include one or more actions, movements, stops (temporary or permanent), travel information, reservations, transportation options, modes of travel, and/or one or more operations relating to navigation systems, entertainment systems, and/or telecommunication systems.

Accordingly, the "journey" of a particular user, or vehicle, may depend upon contextual factors, such as a user and location-to-location (point-to-point) relationship, and other contextual factors such as defined by a user or learned via artificial intelligence. A deeper, cognitive analysis of the journey may be learned based on, for example, standards, rules, practices, and/or learned journey related behaviors of one or more users in various travel, navigational, telecommunication, entertainment, geographic, and/or travel-risk dimensions.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed including on-board (on-vehicle) computing as envisioned in the Embodiments discussed herein.

Figure 1:
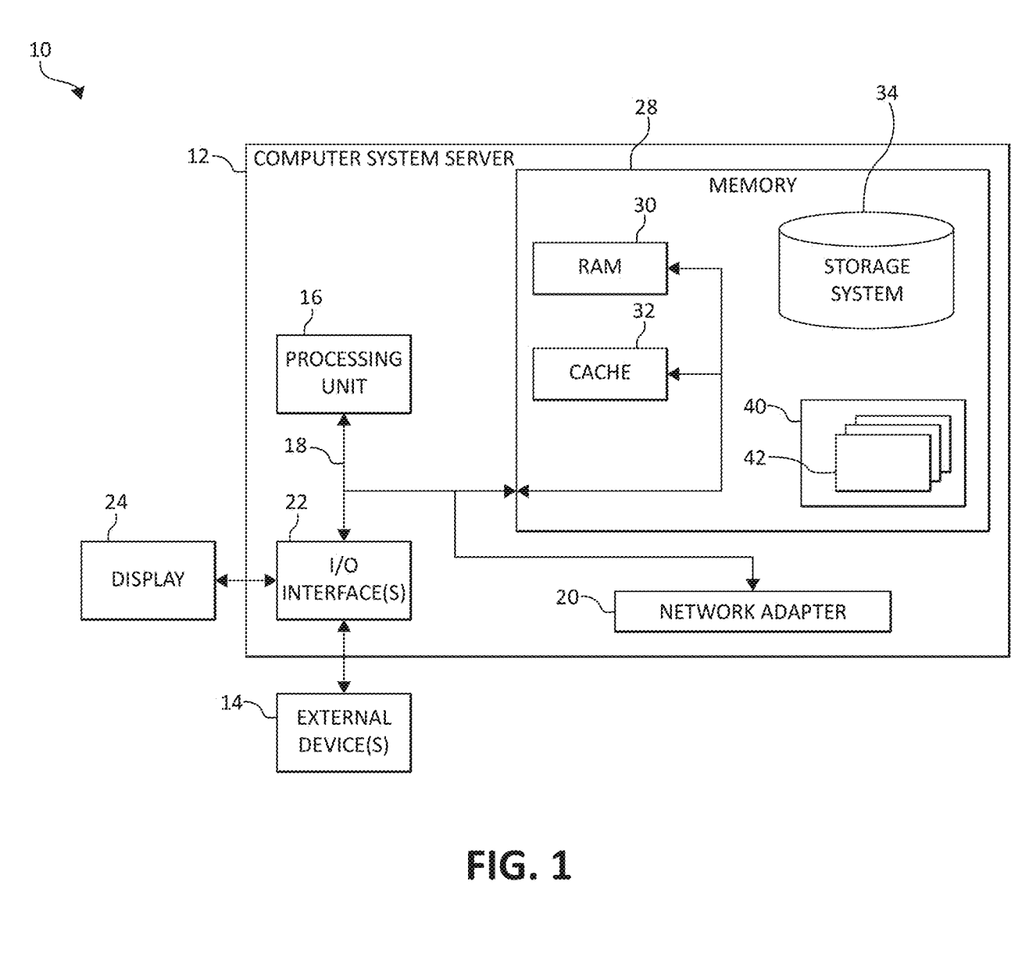
FIG. 1 is a block diagram depicting an exemplary computing node according to an embodiment of the present invention.

Referring now to FIG. 1, a schematic of an example of a computing node is shown. The computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
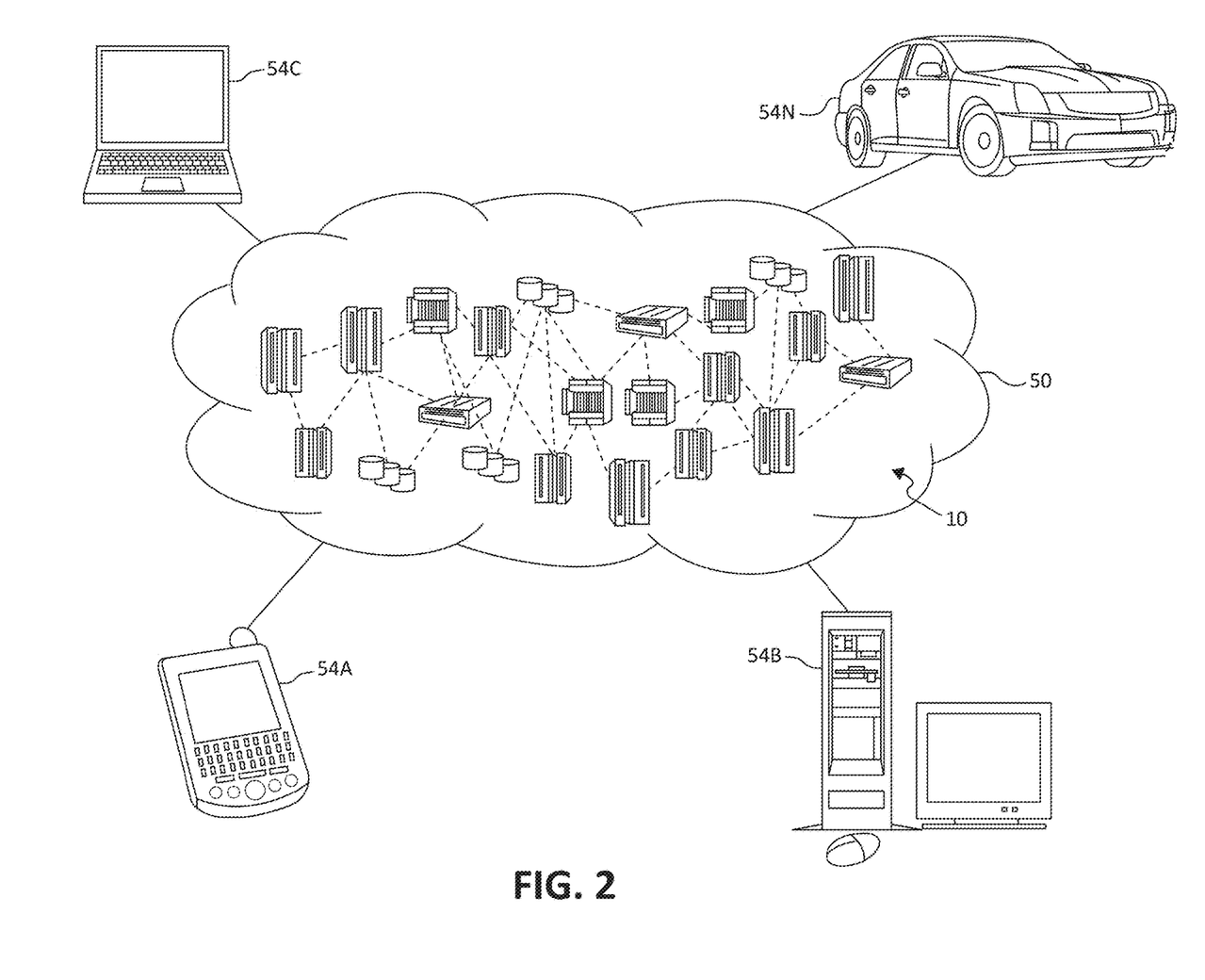
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
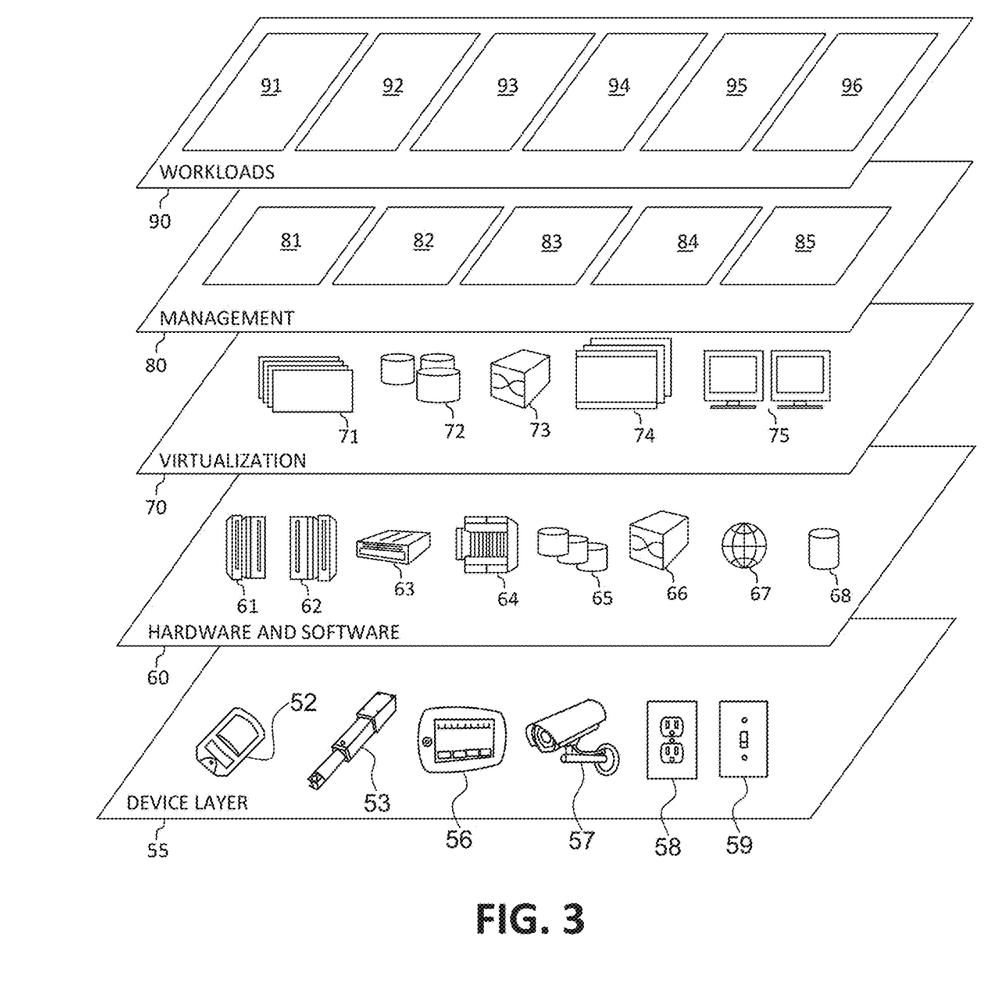
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various cognitive journey planning and dynamic mapping system workloads and functions 96. In addition, workloads and functions 96 for travel route planning and opportunistic searching may include such operations as data analytics, data analysis, and as will be further described, notification functionality. One of ordinary skill in the art will appreciate that the workloads and functions 96 for travel route planning and opportunistic searching may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
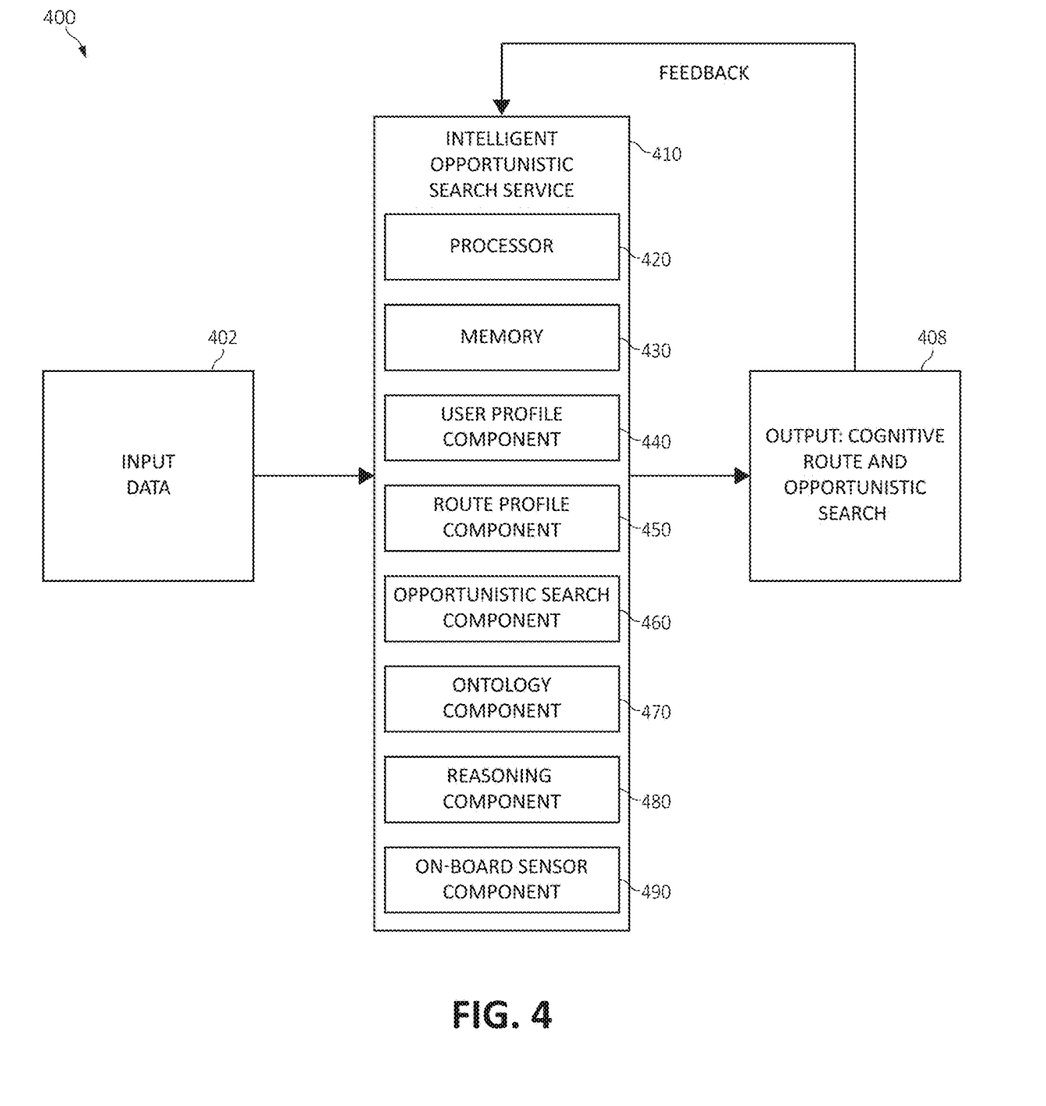
FIG. 4 is an additional block diagram depicting an exemplary functional relationship between various aspects of the present invention.

Turning now to FIG. 4, a block diagram depicting exemplary functional components of a cognitive system 400 according to various mechanisms of the illustrated embodiments, is shown. In one aspect, one or more of the components, modules, services, applications, and/or functions described in FIGS. 1-3 may be used in FIG. 4.

An intelligent opportunistic searching service 410 is shown, incorporating at least one processing unit 420 ("processor") to perform various computational, data processing and other functionality in accordance with various aspects of the present invention. The processor 420 may be in communication with memory 430. A user profile component 440, a route profile component 450, an opportunistic search component 460, an ontology component 470 of a knowledge domain, a reasoning component 480, and an on-board sensor component 490 is shown, each of which may also be in communication with and/or controlled by the processor 420. The user profile component 440, the route profile component 450, and the opportunistic search component 460, the ontology component 470, the reasoning component 480, and the on-board sensor component 490 may each work in concert with the processor 420 and memory 430 to accomplish various aspects of the present invention.

In one aspect, the functional components of the cognitive system 400 illustrate a feedback loop with one or more various inputs 402 used by the intelligent opportunistic searching service 410 to generate an output 408 of one or more routes according to an opportunistic search of an unknown domain for achieving one or more secondary objectives while both progressing towards a primary objective and minimizing travel costs using one or more IoT computing devices (e.g., IoT sensor) and a knowledge of the vehicle relative to one or more waypoints, while also considering one or more various modes of transportation such as, for example, walking, a vehicle, and/or a plane. Thus, the functional components 400 may use a feedback loop for updating data of the intelligent opportunistic searching service 410 based on a route profile for a plurality of routes (using real-time data and/or feedback data relating an opportunistic search on one or more cells of a particular geographical region/neighborhood), a user profile of the one or more users, environmental factors (e.g., a change or shift in the weather or seasons), and/or a collaboration of monitored data relating to user preferences, one or more routes, buildings, geographic locations, landscaping, calendar events, or IoT data, which may be used, if necessary, to assist with the opportunistic search.

As one of ordinary skill in the art will appreciate, the depiction of the various functional units in intelligent opportunistic searching service 410 is for purposes of illustration, as the functional units may be located within the intelligent opportunistic searching service 410 or elsewhere within and/or between distributed computing components.

In one aspect, the intelligent opportunistic searching service 410 may use an ontology component 470. The ontology component 470 may include a knowledge domain or data and meta-data repository of routes, roads, streets, highways, interstates, bridges, airports, train stations, bus stations, airplanes, airports, subways, parking facilities, architectural designs, weather maps, weather and season patterns, maps, a variety of infrastructures relating to travel having information relating to both size, length, a degree of complexity or design of the infrastructure, visibility, problems or issues relating to road work or repair, traffic congestion patterns and data, travel services, travel related retail or commercial businesses, types and descriptions of various means or modes of transportation, user/driver profiles, environmental factors and conditions, and any other types of data or information relating to combining journey planning and opportunistic searching services. It should be noted that such data or information may be added to the ontology or knowledge base through the discovery process/opportunistic search during the journey as described herein, but not pre-loaded prior to the journey.

More specifically, the intelligent opportunistic searching service 410 may not know or have accesses to or know the specific details of the cost/benefit of a knowledge domain prior to commencement of a trip/journey, but may learn, identify, discover information relating to cost/benefit of the knowledge domain while progressing along the journey/trip. That is, the knowledge domain of a network may be unknown, and the cost landscape must be discovered along the journey for the route planning.

In one aspect, a thesaurus or ontology as the knowledge domain, relating to the ontology component 470, may be used for the intelligent opportunistic searching service 410 with the information and concepts relating to routes, roads, streets, highways, interstates, bridges, maps, and/or a variety of infrastructures relating to journey planning and opportunistic searching, user preferences (e.g., a starting location, an ending location, an earliest starting time, a latest arrival time, etc.), building data, route data (e.g., size, length, a degree of complexity or difficulty of a route), visibility, problems or issues relating to road work or repair, and/or traffic congestion. In one aspect, the ontology component 470 may be in association with one or more various applications, which may continuously provide updated information for the ontology. The thesaurus and ontology may also be used to assist with the intelligent opportunistic searching service 410.

In one aspect, the term "domain" is a term intended to have its ordinary meaning. In addition, the term "domain" can include an area of expertise for a system or a collection of material, information, content and/or other resources related to a particular subject or subjects. For example, a domain can refer to information and concepts relating to a space across which travel occurs (e.g., travel network, neighborhood, geographical area, etc.) and/or relating to an opportunistic search of a selected region/cell (e.g., a city or town or a defined section of a city/town), routes, roads, streets, highways, interstates, bridges, maps, and/or a variety of infrastructures relating to travel each having information relating to both user preferences. A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class, concept and/or property.

Content can be any searchable information, for example, information distributed over a computer-accessible network, such as the Internet. A concept can generally be classified into any of a number of concepts which may also include one or more sub-concepts, all potentially connected with other concepts via properties defined in the ontology. Examples of concepts may include, but are not limited to, information and concepts relating to user preferences, opportunistic searching, routes, roads, streets, highways, interstates, bridges, maps, travel costs, and/or a variety of infrastructures relating to journey planning having information relating to both opportunistic searching, user preferences, transportation networks, vehicles, building data, route data (e.g., size, length, a degree of complexity or difficulty of a route), visibility, problems or issues relating to road work or repair, and/or traffic congestion, information about individual people, cultures, groups, sociological groups, market interest groups, institutions, universities, governments, teams, travel services, travel costs, or any other travel related services or industries. The ontology can be continuously updated with the information synchronized with the sources, adding information from the sources to the ontology as models, attributes of models, or associations between models within the ontology.

In one aspect, the intelligent opportunistic searching service 410 may provide one or more suggestions of optimized routes while taking into account various inputs 402. The intelligent opportunistic searching service 410 provides for a vehicle to travel/move from point A to point B (primary mission) and along the way discover, search, and/or learn as data/information about the region the vehicle is traversing where "learning" is guided by a set of goals and enabled by the sensing modes (e.g., using the on-board sensor component 490) active on the vehicle. That is, the on-board sensor component 490 may be used to map the cost landscape in a local/localized neighborhood/are before deciding where to move. The transformation of the sensor input (e.g., voltage or pixelated image) into a cost value for each cell using the on-board sensor component 490 may perform analytics using machine learning operations and/or artificial intelligence "AI."

The intelligent opportunistic searching service 410 determine the shortest distance route to the one or more waypoints, and/or may perform an opportunistic search to map areas of low-cost or high-benefit region within proximity of a shortest distance route. In one aspect, the low-cost or high-benefit region may be determined by a user prior to the start of the journey and may be measured in a local neighborhood through one or more sensors on a vehicle and learning algorithms applied to the output of the sensors.

Additionally, the intelligent opportunistic searching service 410 define a weighted value placed on accomplishing a primary task of navigating the one or more waypoints compared to a defined weight placed on exploring the unknown domain to accomplish a secondary goal.

As previously stated, the intelligent opportunistic searching service 410 may operate in a closed loop environment by receiving one or more inputs 402 into the intelligent opportunistic searching service 410 and by providing one or more outputs 408 for planning of a journey having maximized exposure to sunlight on the journey. In one aspect, the intelligent opportunistic searching service 410 may operate in an edge-computing environment.

For example, one or more inputs 402 such as, for example, user data, mapping information, opportunistic searching data, weather data, environmental factors, traffic parameters/data, user profiles, route profiles, means or modes of transportation, travel services, calendar schedules, and the like, may be integrated together using the intelligent opportunistic searching service 410 to map and suggest a journey according to the opportunistic searching. The inputs 402 may also include one or more coordinates of a starting location, coordinates of a location of the primary objective, coordinates of the one or more waypoints.

The user profile component 440 may be used to collect, store, and/or retrieve data relating to a user such as, for example, a defined starting location, a defined ending location, a preferred start time, an earliest possible start time (based on a user's schedule or preference), a preferred end time, a latest possible end time (based on a user's schedule or preference), mode of transportation preference (e.g., walking, biking, taking a taxi, vehicle, and the like), waypoints, transportation preferences, driving habits, experiences, calendar information, preferences and interests, a physical or emotional condition of the user, travel experience of the user, weather data, and defined preferences indicating an amount or desire for the exposure to light.

In one aspect, a waypoint may be an intermediate point or place on a route or line of travel, a stopping point or point at which course is changed. A waypoint may also be a ground position referable to the coordinates of the vehicle guidance system or steering geometry. A waypoint may also be a position combined with a heading and/or a speed. It may also be any time derivative of position, such as acceleration. In general, a waypoint may be a datum or data set to which vehicle position is referable. A waypoint may include elevation as well as ground position.

The route profile component 450 may include cells/sections of a geographic landscape/neighborhood/city/region, landscape mapping, building mapping, weather pattern data, sub-segments of a total route, a maximum or minimum speed relating to a route, a type of travel route, a length of a travel route, an elevation, mapping information, and one or more points of interest.

The route profile component 450 may receive, identify, and/or provide one or more coordinates of a starting location, coordinates of a location of the primary objective, coordinates of the one or more waypoints.

The opportunistic search component 460 may dynamically plan a route for a vehicle according to an opportunistic search of an unknown domain to achieve one or more secondary objectives while both progressing towards a primary objective and minimizing travel costs using one or more IoT computing devices and a knowledge of the vehicle location relative to one or more waypoints. The opportunistic search component 460 may perform the opportunistic search to identify explore the region between waypoints to discover a lowest cost route to the one or more waypoints.

The opportunistic search component 460 may determine travel costs of the route in real-time while the vehicle travels the route. The opportunistic search component 460 may determine a composite cost for the route. The composite cost may be a combination of both a maximum distance to the one or more waypoints and a minimum travel cost considered across a plurality of cells of the domain, wherein the domain is an identified geographical region.

The route profile component 450, in association with the opportunistic search component 460, may indicate to the vehicle to move to a location having a lowest determined composite cost. The route profile component 450, in association with the opportunistic search component 460, may update the route at each of the one or more waypoints while the vehicle moves along the route.

Additionally, the reasoning component 480 may be used to reason and interact with a user. The reasoning may include employing an artificial intelligence system to "reason" with the user. The reasoning may include justifying (e.g., providing support/evidence in a language format such as, for example, audible or written communication) to the user the "reason" or support for each suggestion. The reasoning may include learning one or more coordinates, one or more waypoints, one or more primary and secondary objectives, and/or personal preferences.

Thus, the intelligent opportunistic searching service 410 may be used to generate an output 408 that includes one or more segments of a route for a vehicle according to an opportunistic search of an unknown domain to achieve one or more secondary objectives while both progressing towards a primary objective and minimizing travel costs using one or more IoT computing devices and a knowledge of the vehicle location relative to one or more waypoints.

The output 408 may be a customized and dynamic mapping that suggests one or more routes, paths, streets, railways, walkways, or a combination thereof that considers both 1) the opportunistic search of an unknown domain to achieve secondary objectives while both progressing towards the primary objective, and 2) the travel costs and the knowledge of the vehicle location relative to one or more waypoints.

In general, the components of the intelligent opportunistic searching service 410 may each undergo various data analytics functions. As one of ordinary skill in the art will appreciate, the components of the route execution and opportunistic searching service 410 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In one aspect, the various functional units in intelligent opportunistic searching service 410 analysis may apply to one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
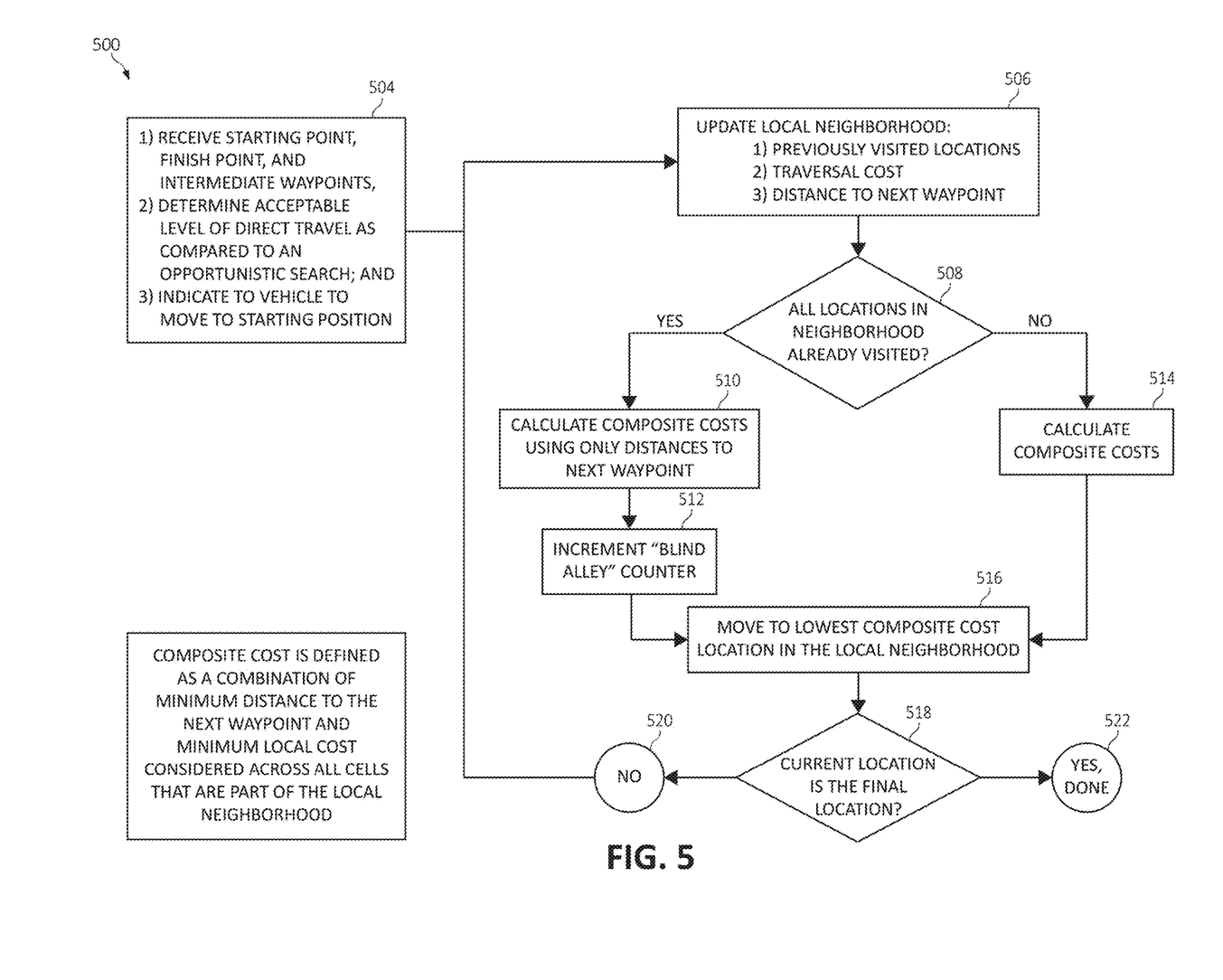
FIG. 5 is a flowchart diagram depicting an additional exemplary method for combined route planning and opportunistic searching in variable costs environments by a processor, again in which aspects of the present invention may be realized.

Turning now to FIG. 5, a method 500 for combined route planning and opportunistic searching in variable costs environments by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium.

In block 504, 1) a starting point, an ending point (e.g., finish location or "primary objective"), and one or more intermediate waypoints (e.g., secondary objectives/points the vehicle is to stop/travel to) may be defined, provided, and/or received, 2) an acceptable level of direct travel as compared to an opportunistic search may be determined (e.g., how much weight to apply for reaching the final/end point within a defined period of time as compared to an opportunistic search), and 3) an indication may be provided to a vehicle to move to a starting position (e.g., the drone or UAV moves to the starting position).

Information related to a section/cell of a selected area (e.g., local neighborhood information) may be updated using one or more IoT sensors on the vehicle according to 1) previously visited sections/cells (e.g., locations), 2) traversal costs (e.g., what is the cost/benefit if going to each particular location), and/or 3) a distance to a next/subsequent waypoint (e.g., how far or how much time will it take to reach the next waypoint), as in block 506. Once the data has been collected and/or updated, a determination operation may be performed to determine the next point on a route for the vehicle to move.

A determination may be performed to determine whether all sections/cells (e.g., locations) in the selected area (e.g., neighborhood) have previously been visited, as in block 508. If yes at block 508, a composite cost may be calculated using only distances to the next/subsequent waypoint, as in block 510. That is, if all the places have been visited, then the local cost and opportunistic search may be ignored, and a determination operation is executed to determine how to reach the endpoint/primary objective or the next waypoint. The vehicle (e.g., drone/UAV) may then move to the next point that is closest to the endpoint/primary objective or moves to the next waypoint. Otherwise, the composite cost may be defined as a combination of both a maximum distance to the one or more waypoints and a minimum travel cost considered across all cells of that are part of the local neighborhood. The local neighborhood may an identified region of a larger neighborhood/region.

From block 510, a "dead-end" counter may be incremented, as necessary, as in block 512. It should be noted that fewer "dead-ends" indicate a more efficient opportunistic search. Returning now to block 508, if not all of the sections/cells (e.g., locations) in the selected area (e.g., neighborhood) have previously been visited, the compute costs may be calculated, as in block 514.

From both blocks 512 and 514, the functionality of method 500 may move to block 516. An indication to the vehicle may be provided for the vehicle to move/travel to a lowest composite cost in a section/cell (e.g., location) in the selected area (e.g., a local neighborhood), as in block 516. A determination operation may be performed to determine whether the current location of the vehicle is a final location (e.g., the primary objective), as in block 518. If no 520 at block 518, the method 500 may return to block 506. If yes at block 518, the functionality 500 may end, as in block 520.

In view of the operations and functionalities of FIG. 1-5, it should be noted that the route finding process may apply one or more operations/calculations to identify routes that accommodate varying degrees of opportunistic search. For example, a domain over which the route needs to be determined may be discretized into 300×300 cells of uniform size (e.g., 1.0×1.0) and where each cell has a fixed cost of traversal and those costs vary across the domain as illustrated in the cost of traversing each cell. It should be noted that a complete map is unknown to the traveler prior to beginning the journey and only the locations of the starting and ending points along with any intermediary waypoints are available. The choice of minimizing composite cost is arbitrary and may be used also to maximize a composite benefit that could also be displayed.

For example, in a two-dimensional "2D" domain, a local neighborhood may be defined to be a selected number of cells (e.g., 8 cells) surrounding a current location. Movement from the current location to any one of the 8 cells may be permitted (includes diagonal moves). The location within the local neighborhood is indexed as (i,j) to define the row and column within the neighborhood. The straight-line distance from each cell in the neighborhood to the next waypoint is calculated and may be modified such that for all straight-line distances within the local neighborhood, the minimum distance value is 1.0:

$$\text{dist}(i,j) = \text{straightline\_Dist}(i,j) - \text{Min}(\text{straightline}_{dist(:,:)}) + 1.0 \qquad (1),$$

where dist is the modified distance. The composite cost (e.g., CompCost) for every point in the neighborhood/area may be calculated as a combination of the cell traversal cost (e.g., TravCost) and a non-linear transform of the modified distance to the next waypoint. The value of TravCost for any cell in the neighborhood/areas is determined from the sensors on the vehicle or traveler and may also require additional processing or learning with algorithms that use the sensor signals as input. The modified distances to the next waypoint and the traversal costs may be combined into a composite cost as illustrated in the following equation:

$$CompCost(i,j) = TravCost(i,j) + e^{(\omega \cdot dist(i,j))} \quad (2),$$

where c parameter controls the balance between opportunistic search versus direct travel with values of co near 1.0 creating essentially straight-line travel to the next waypoint and low values of co creating considerable exploration of the domain away from the straight-line path. Also, re-visiting (e.g., backtracking) a previously visited cell is an in-efficient means of travel. However, an opportunistic search can lead down "dead-ends" from which the only way out is to backtrack along a path already visited. When a dead-end is reached, all nodes in the local neighborhood have already been searched. The traversal cost component/operation of the composite cost may be set to zero such that the next move may be directly towards the next waypoint (minimum distance) and cells can be revisited until reaching a cell that has not previously been visited at which point the traversal cost is added back into the composite cost calculation. The embodiment of this disclosure may track the number of times a dead-end is encountered in the search.

In view of the foregoing, consider the following examples of implementation of the aforementioned functionality for the combined route planning and opportunistic searching service in variable costs environments. That is, the following examples illustrate use of the route planning and opportunistic searching service by discovering a low-cost path (e.g., low-cost or high-benefit region path) from start to end of a journey that enables opportunistic exploration (e.g., searching) of an unknown domain while making progress towards a more distant goal.

Example 1: Aerial Imaging

One or more unmanned aerial vehicles (UAV's or "drones") tasked with a commercial mission such as delivering packages between two entities may take on an added task of acquiring high-resolution imagery of the geography between a start point and an end point of the journey. The aerial imaging may be acquired within previously defined topic areas of interest (e.g., "parks" or "residential") with specific areas defined in real-time through a local search by the drone as the drone moves towards a next/subsequent destination. The present invention allows the operator of the drone to balance (e.g., a cost/benefit analysis) an amount of effort to spend on the secondary service of imagery acquisition against the available power resources and urgency of the delivery. The twin goals of delivering the package on time and with enough battery to complete the trip (e.g., primary mission/objective) and to also acquire updated imagery of land types that were previously unmapped or have outdated imagery (e.g., secondary mission/objectives) can be accomplished. Thus, the drone may be routed/moved to deliver the parcel/cargo successfully and on time while also collecting imagery of a defined interest type, but in unknown locations between the start and end of the journey.

Example 2: Travel and Exploration

When driving between two known points, a user/traveler may desire to explore shopping, dining, and/or recreational opportunities in different locations along the journey from a starting point to an ending point. While individual locations or multiple locations of a particular type can be identified online, exploring a region/neighborhood to become familiar with all of the opportunities offered and how they fit together, requires personal experience. As these types of side trips (e.g., unplanned stops) can be time consuming and often distracting, the present invention enables the user to balance the time spent on the side explorations against reaching the final destination on time. Thus, the present invention provides for reaching the final destination on time, but also explore regions of interest on the way.

Example 3: Environmental Sensing

Similar to the drone imaging, one or more air quality sensors may be mounted on a drone to sample the air between the start and finish points with higher concentrations of an airborne compound defining a higher benefit (lower cost) location. The degree of opportunistic search may deviate the straight-line point-to-point route of the drone to acquire relatively higher concentration samples of an airborne compound while still completing the primary mission on time. Thus, the present invention provides for the drone to be routed to complete the primary mission successfully and on time while also collecting air samples (e.g., secondary objective) of a specified compound in a priori unknown locations between the start and end of the journey.

Example 4: Military Search and Capture

A military unit may be required to move between two locations and is also tasked with searching for encampment of other military units along the way. Conditions that are most conducive to hosting an alternative military unit encampment can be defined and locally identified en-route. The tradeoff to manage is to move between the locations in a reasonable amount of time and minimize fuel costs while also searching extensively for alternative military unit encampments in locations deemed to be where they are most likely to be found and to limit exploration in areas where they are least likely to be found. Thus, the present invention provides for completing an opportunistic search for alternative military unit positions in areas where the alternative military unit are likely to be found while still reaching the objective destination on time.

Example 5: Search and Rescue

In one aspect, small deviations in a course may take a user into areas with a higher probability of intersecting a location of a lost person or asset (e.g., changing the course of a ship to improve the chances of finding a life raft where the probability of the life raft location map is being continuously updated (i.e., not known beyond the current time and location)). Thus, the present invention provides for delivery of passengers and/or cargo via a vehicle within a specified time window while providing maximum assistance in a search rescue operation.

Example 6: Turbulence Avoidance

Airlines continuously adjust routes in mid-flight to avoid areas of turbulence. However, knowing ahead of time where turbulence exists and where it will be worst over the time span of the flight is an inexact science. Local 3D information from on-board sensors and real-time reports from other airplanes that have recently traversed the same or nearby areas can be used to search the local area. Thus, the present invention provides for an airplane to place more, or less, emphasis (e.g., a greater weight/higher rank) on getting to the destination on time and less, or more, emphasis (e.g., a lesser weight/lower rank) on avoiding turbulence by minimizing the amount and level of turbulence while meeting schedule on point to point flights.

Example 7: Security Patrols

The present invention may apply to autonomous (Robotic) security patrols where a general route is known and set with fixed waypoints, but conditions change continuously and therefore the exact route is not static and areas needing further exploration change from one patrol to the next. The robotic patrol may use one or more imaging tools and sensors for local and real-time identification of high/low benefit areas. A user may increase an amount of exploration/searching and/or re-defining the definition of what defines a high-benefit area for a given patrol as general levels of risk rise or decline. Thus, the present invention provides robots for security patrols to automate a patrol route and a level of detailed inspection based on real time information gathered through local imaging.

Example 8: Prospecting

Multi-spectral and hyper-spectral imaging tools may be used on a drone to image a land surface for traces of minerals that are indicative of economically viable ore deposits. The present invention provides for prospecting by drones (e.g., self-guided drones) using real-time imaging of the area surrounding a current location to make decision on where to go next to find a highest benefit (e.g., highest trace mineral concentrations) areas along the path from start to destination. Waypoints identified from previously completed coarser resolution surveys may be used to guide the general area of the finer resolution search done with the drone. This application may be the primary task for the drone with the user only weighing an amount of search against the power and imaging limits of the drone. Thus, the present invention provides an opportunistic search for mineral deposits using spectral imaging on an automated drone.

Figure 6A:
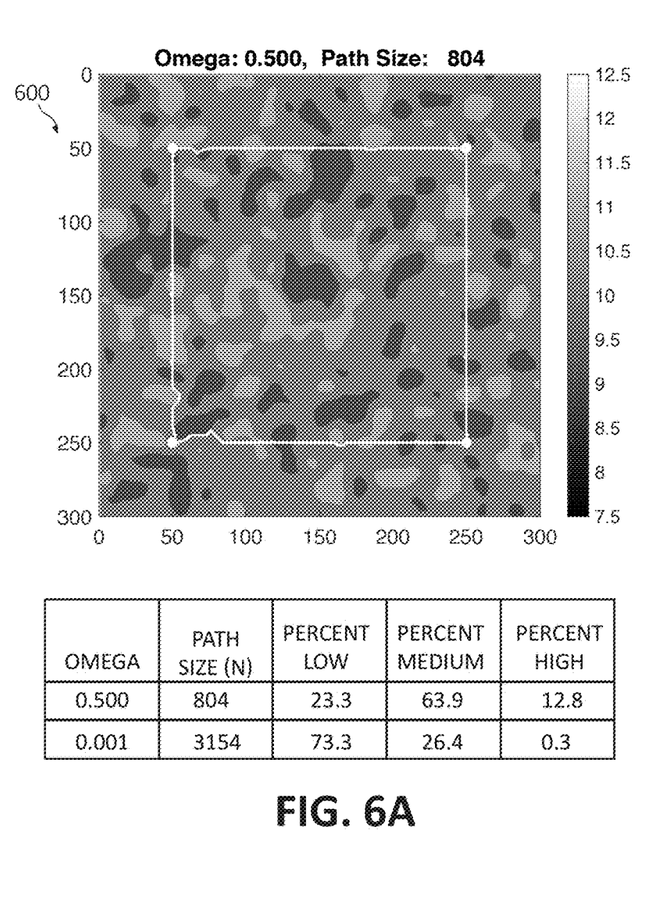
FIG. 6A-B are cost maps showing four waypoints and corresponding paths calculated with a high, moderate, and low weighting of opportunistic search that also intersect the specified way points, in which various aspects of the present invention may be realized.
Figure 6B:
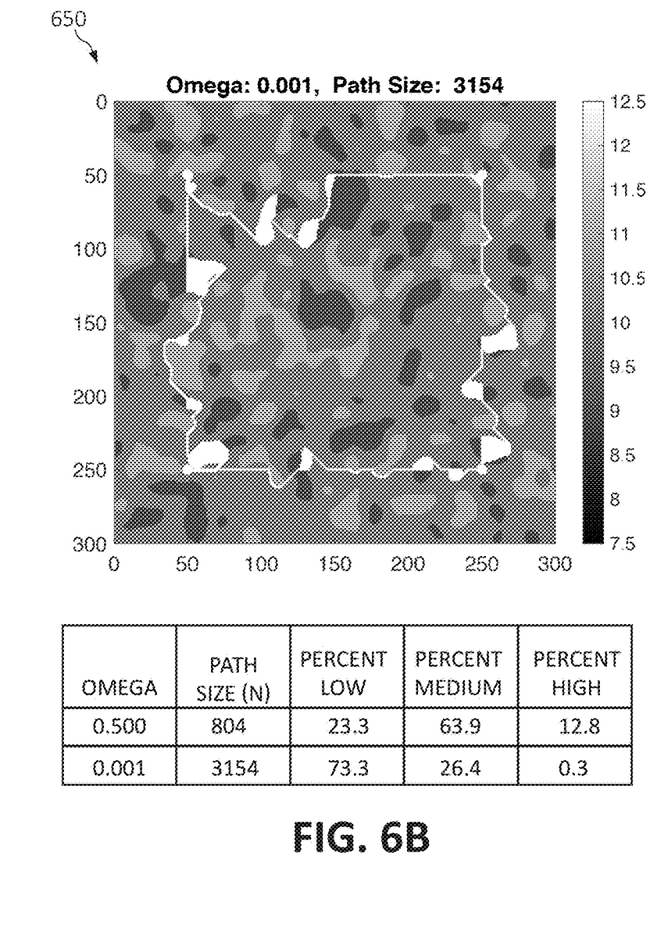

Turning now to FIGS. 6A and 6B which each show the same grey-scale cost map and the same four waypoints. The cost map shown in each figure has only three values: Low (black), Medium (dark grey) and High (light grey), corresponding to values of 9.0, 10.0 and 11.0, respectively. Approximately 68% of the map is Medium cost (dark grey) and the remaining 32% of the map is split evenly between Low (Black) and High (Light Grey) cost regions. It is noted that the cost values within these regions are arbitrary and could be any range of values as defined by the objectives of the secondary mission and observed by the sensors used to map the costs. These cost maps are unknown by the vehicle. Shown on top of the greyscale maps are two vehicle paths calculated with a high value of $\omega$: 0.500 giving little importance to the opportunistic search (FIG. 6A), and a low value of $\omega$: 0.001 giving larger importance to the opportunistic search (FIG. 6B)

Setting $\omega$ to 0.500 is a user-setting that indicates the vehicle should minimize the amount of opportunistic search along the path and move along a straight-line path between the waypoints. This focus on minimizing the amount of opportunistic search and maximizing the directness of travel to accomplish the primary mission results in a set of nearly straight lines connecting the four waypoints. While some deviation from the straight-line paths to avoid high-cost regions or explore the edge of low-cost regions is accommodated, a search with $\omega$=0.500 places great emphasis on a primary mission and achieving a path between the waypoints with minimal length. Moving now to FIG. 6B, a strongly opportunistic search is performed by setting $\omega$=0.001. The change from the path in FIG. 6A is striking: a significantly large portion of the domain is included as part of the path and this inclusion is strongly biased towards the lowest cost (black) regions. Whereas in FIG. 6A, the path explored the edges of several low-cost (black) regions, in FIG. 6B, considerable areas within these low-cost regions are traversed by the vehicle as it moves towards the next waypoint. Table 1 compares the size of the paths shown in FIGS. 6A and 6B and the proportions of the different cost regions that comprise each path. A minimum possible path size is 796 cells. As illustrated in FIG. 6A there is a slight increase in the path size over the minimum possible, but the high value of c indicating a plan to minimize effort spent on the secondary mission results in a short path. The lower value of $\omega$ used in FIG. 6B results in a path that is nearly four times larger than that shown in FIG. 6A and with the focus shifted to more emphasis on the secondary mission, the amount of exploration of low-cost areas increases dramatically. From Table 1, comparing the two paths, the emphasis on the secondary mission increases the proportion of the path within the low-cost region by 50% compared to the path shown in FIG. 6A. The emphasis on the secondary mission not only promotes exploration of the low-cost regions, it also leads to an avoidance of high-cost regions with only 0.3% of the path in FIG. 6B in high-cost areas.

Figure 7:
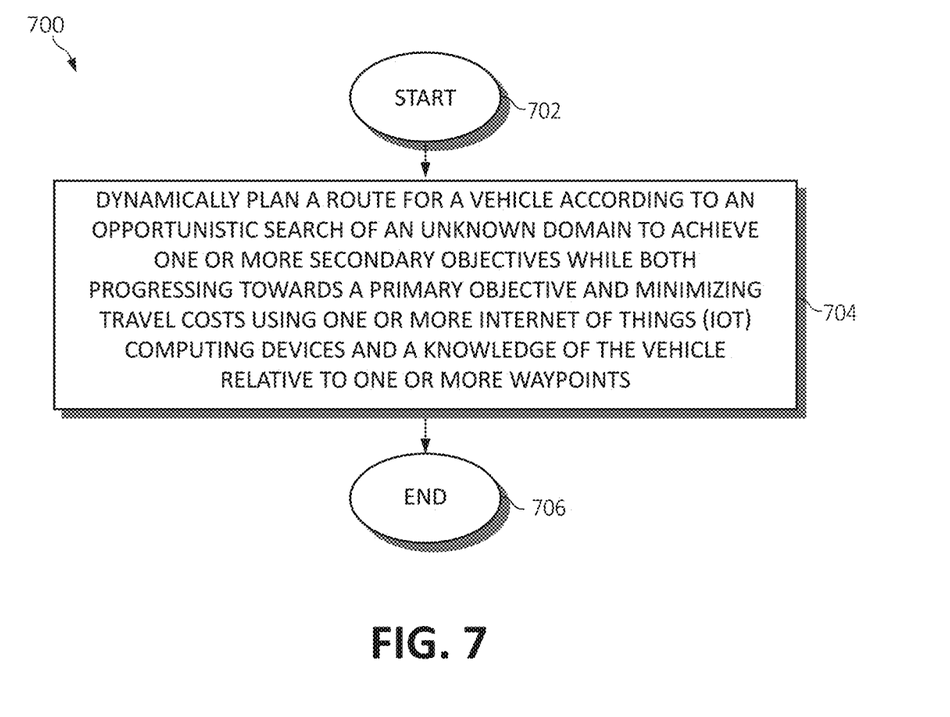
FIG. 7 is a flowchart diagram of an additional exemplary method for combined route planning and opportunistic searching in variable costs environments by a processor, in which various aspects of the present invention may be realized.

Turning now to FIG. 7, a method 700 for combined route planning and opportunistic searching in variable costs environments by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium.

The functionality 700 may start in block 702. A route for a vehicle may be dynamically planned according to an opportunistic search of an unknown domain to achieve one or more secondary objectives while both progressing towards a primary objective and minimizing travel costs using one or more IoT computing devices and a knowledge of the vehicle relative to one or more waypoints, as in block 704. The functionality 700 may end, as in block 706.

In one aspect, in conjunction with and/or as part of at least one block of FIG. 7, the operations of method 700 may include each of the following. The operations of method 700 may provide coordinates of a starting location, coordinates of a location of the primary objective, coordinates of the one or more waypoints. The operations of method 700 may perform the opportunistic search to identify a shortest distance route to the one or more waypoints, determine travel costs of the route in real-time while the vehicle travels the route, and/or determine a composite cost for the route. The operations of method 700 may indicate to the vehicle to move to a location having a lowest determined composite cost, and update the route at each of the one or more waypoints while the vehicle moves along the route.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for combined route planning and opportunistic searching by a processor, comprising:
dynamically planning a route for a vehicle according to an opportunistic search of an unknown domain to achieve one or more secondary objectives while both progressing towards a primary objective and minimizing travel costs using one or more Internet of Things (IoT) sensors and computing devices and a knowledge of a location of the vehicle relative to one or more waypoints; and
pursuant to dynamically planning the route, determining a composite cost for the route within a local neighborhood, wherein the composite cost is a combination of both a maximum distance to the one or more waypoints and a minimum travel cost considered across a plurality of cells of the unknown domain, wherein the unknown domain is an identified geographical region.

2. The method of claim 1, further including providing coordinates of a starting location, coordinates of a location of the primary objective, and coordinates of the one or more waypoints.

3. The method of claim 1, further including determining a shortest distance route to the one or more waypoints.

4. The method of claim 1, further including determining travel costs of the route, inclusive of the composite cost, in real-time while the vehicle travels the route.

5. The method of claim 1, further including performing the opportunistic search to map areas of a low-cost or high-benefit region within proximity of a shortest distance route.

6. The method of claim 1, further including indicating to the vehicle to move to a location having a lowest determined composite cost.

7. The method of claim 1, further including updating the route at each of the one or more waypoints while the vehicle moves along the route.

8. The method of claim 1, further including defining a weighted value placed on accomplishing a primary task of navigating the one or more waypoints compared to a defined weight placed on exploring the unknown domain to accomplish a secondary goal.

9. A system for combined route planning and opportunistic searching, comprising:
one or more computers with executable instructions that when executed cause the system to:
dynamically plan a route for a vehicle according to an opportunistic search of an unknown domain to achieve one or more secondary objectives while both progressing towards a primary objective and minimizing travel costs using one or more Internet of Things (IoT) sensors and computing devices and a knowledge of a location of the vehicle relative to one or more waypoints; and
pursuant to dynamically planning the route, determine a composite cost for the route within a local neighborhood, wherein the composite cost is a combination of both a maximum distance to the one or more waypoints and a minimum travel cost considered across a plurality of cells of the unknown domain, wherein the unknown domain is an identified geographical region.

10. The system of claim 9, wherein the executable instructions further provide coordinates of a starting location, coordinates of a location of the primary objective, and coordinates of the one or more waypoints.

11. The system of claim 9, wherein the executable instructions determine a shortest distance route to the one or more waypoints.

12. The system of claim 9, wherein the executable instructions further perform the opportunistic search to map areas of low-cost or high-benefit region within proximity of a shortest distance route.

13. The system of claim 9, wherein the executable instructions further determine travel costs of the route, inclusive of the composite cost, in real-time while the vehicle travels the route.

14. The system of claim 9, wherein the executable instructions further indicate to the vehicle to move to a location having a lowest determined composite cost.

15. The system of claim 9, wherein the executable instructions further update the route at each of the one or more waypoints while the vehicle moves along the route.

16. The system of claim 9, wherein the executable instructions further define a weighted value placed on accomplishing a primary task of navigating the one or more waypoints compared to a defined weight placed on exploring the unknown domain to accomplish a secondary goal.

17. A computer program product for, by a processor, combined route planning and opportunistic searching, the computer program product comprising a non-transitory computer-readable storage medium having computer-readable program code portions stored therein, the computer-readable program code portions comprising:
an executable portion that dynamically plans a route for a vehicle according to an opportunistic search of an unknown domain to achieve one or more secondary objectives while both progressing towards a primary objective and minimizing travel costs using one or more Internet of Things (IoT) sensors and computing devices and a knowledge of a location of the vehicle relative to one or more waypoints; and
an executable portion that, pursuant to dynamically planning the route, determines a composite cost for the route within a local neighborhood, wherein the composite cost is a combination of both a maximum distance to the one or more waypoints and a minimum travel cost considered across a plurality of cells of the unknown domain, wherein the unknown domain is an identified geographical region.

18. The computer program product of claim 17, further including an executable portion that provides coordinates of a starting location, coordinates of a location of the primary objective, and coordinates of the one or more waypoints.

19. The computer program product of claim 17, further including an executable portion that:
determines a shortest distance route to the one or more waypoints; or
performs the opportunistic search to map areas of a low-cost or high-benefit region within proximity of the shortest distance route.

20. The computer program product of claim 17, further including an executable portion that determines travel costs of the route, inclusive of the composite cost, in real-time while the vehicle travels the route.

21. The computer program product of claim 17, further including an executable portion that indicates to the vehicle to move to a location having a lowest determined composite cost.

22. The computer program product of claim 17, further including an executable portion that updates the route at each of the one or more waypoints while the vehicle moves along the route.

23. The computer program product of claim 17, further including an executable portion that defines a weighted value placed on accomplishing a primary task of navigating the one or more waypoints compared to a defined weight placed on exploring the unknown domain to accomplish a secondary goal.

* * * * *